No. 787,670. PATENTED APR. 18, 1905.
E. W. HYDE.
VELOCIPEDE.
APPLICATION FILED JAN. 28, 1904.
3 SHEETS—SHEET 2.
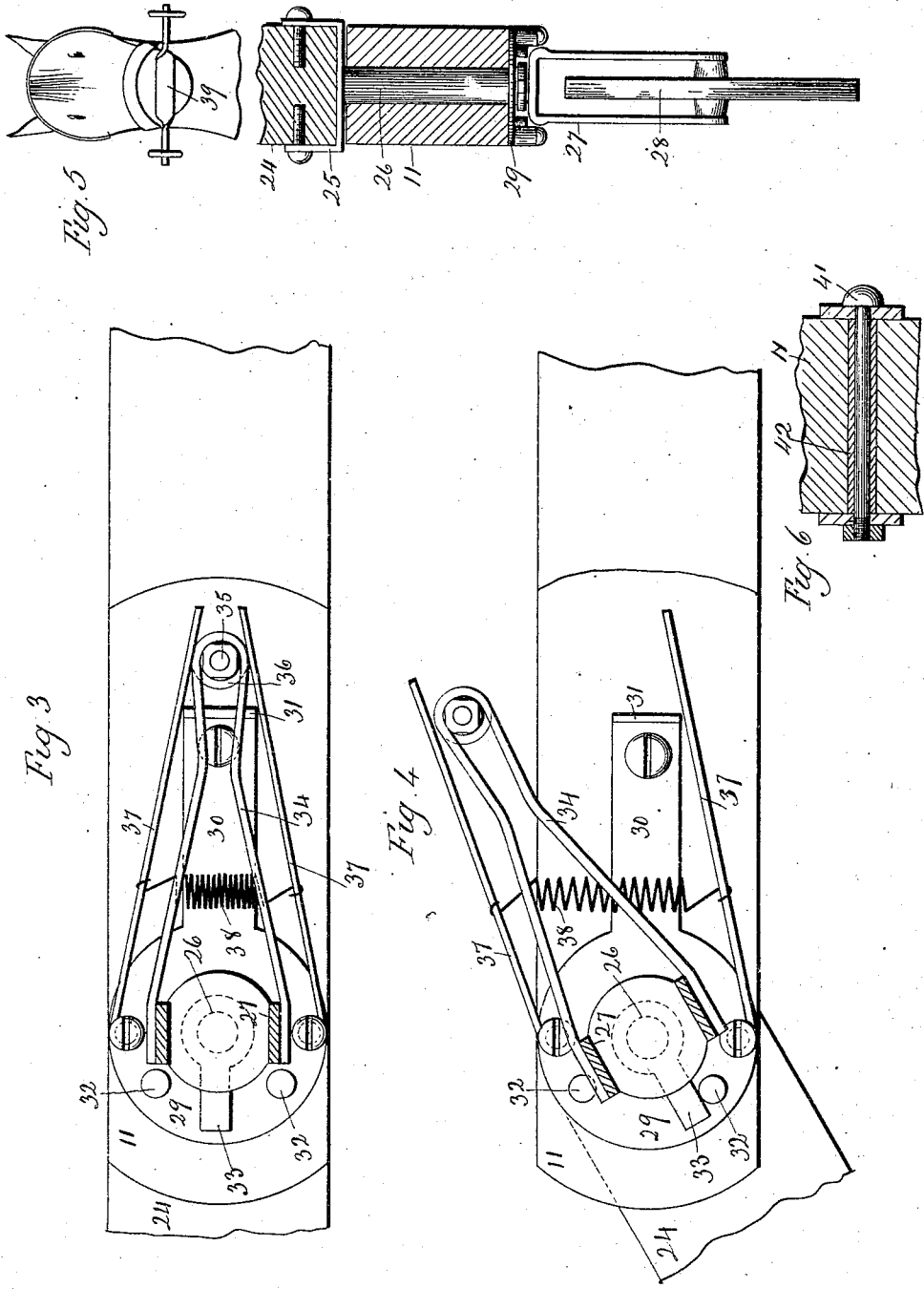

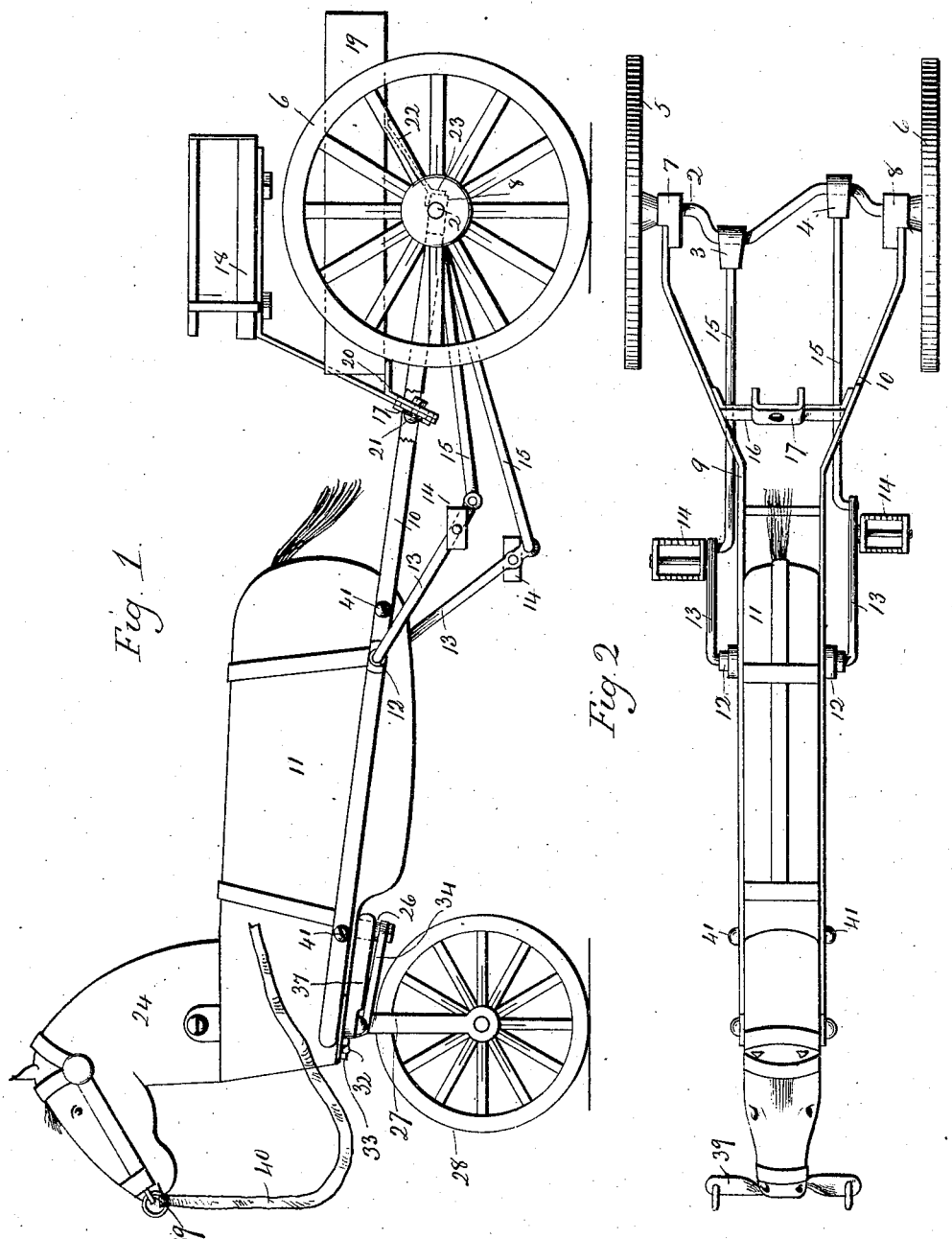

No. 787,670. PATENTED APR. 18, 1905.
E. W. HYDE.
VELOCIPEDE.
APPLICATION FILED JAN. 28, 1904.
3 SHEETS—SHEET 3.
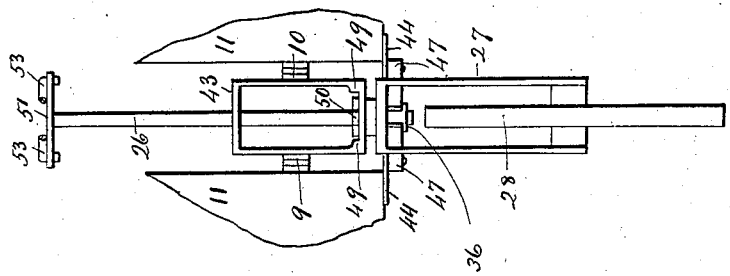
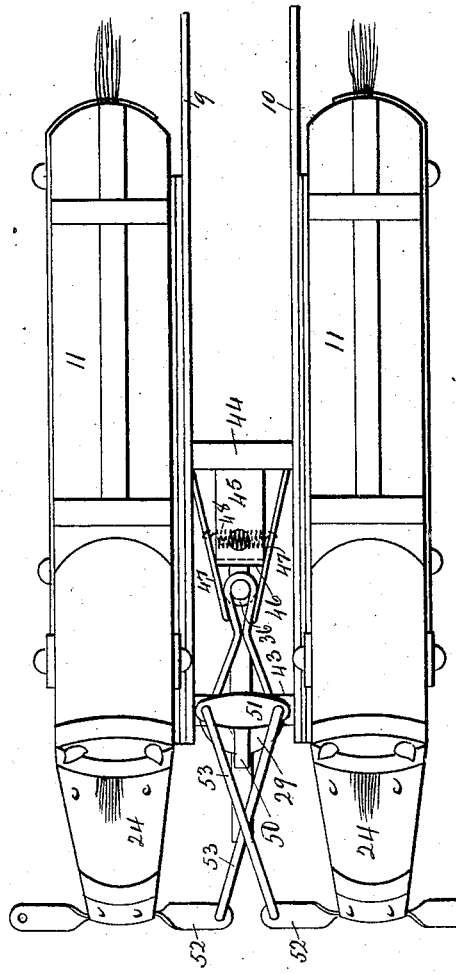

No. 787,670.

Patented April 18, 1905.

UNITED STATES PATENT OFFICE.

EBEN W. HYDE, OF NEW HAVEN, CONNECTICUT.

VELOCIPEDE.

SPECIFICATION forming part of Letters Patent No. 787,670, dated April 18, 1905.

Application filed January 28, 1904. Serial No. 190,954.

*To all whom it may concern:*

Be it known that I, EBEN W. HYDE, of New Haven, in the county of New Haven and State of Connecticut, have invented a new and useful Improvement in Velocipedes; and I do hereby declare the following, when taken in connection with the accompanying drawings and the numerals of reference marked thereon, to be a full, clear, and exact description of the same, and which said drawings constitute part of this specification, and represent, in—

Figure 1, a side view of a velocipede constructed in accordance with my invention; Fig. 2, a detached view of the same with the seat or saddle and wagon-body removed; Fig. 3, an under-side view of the forward end of the body, showing the upper end of the front fork in section; Fig. 4, a similar view with the fork turned to one side; Fig. 5, a front view, partially in section, showing the connection between the head and the forward wheel; Fig. 6, a sectional view through one of the bolts and bushings by which the shafts are connected to the body; Fig. 7, a top view showing the employment of two horses and modified means for holding the front wheel in a straight line with the rear wheels; Fig. 8, a broken front view of the same.

This invention relates to an improvement in velocipedes, and particularly to that class which include a seat or carriage and a horse and in which the device is guided by turning a front wheel arranged beneath the horse, the object of the invention being a simple construction in which the front wheel is normally held in a straight line with the rear wheels, and one in which the wagon-body may be conveniently attached or detached, and in certain details of construction and combination of parts, as will be more fully described, and particularly recited in the claims.

In carrying out my invention I employ an axle 2, having cranks 3 4 and wheels 5 6 rigidly connected therewith. Upon the axle and near the wheels are blocks 7 8, to which the shafts 9 10 are connected. At a point slightly forward of the axle the shafts converge toward each other and then extend forward in parallel lines on opposite sides of the horse-body 11, to which they are rigidly attached. On the outer face of each of the shafts near the rear of the horse is a socket 12, in which pedal-levers 13 are swiveled, the levers carrying pedals 14 and connected by links 15 with the cranks 3 and 4, the pedals being arranged to swing outside the shafts 9 and 10. At a point slightly forward of the wheels the shafts are connected by a brace 16, to which a seat-post 17 is connected, the brace being slightly inclined rearward, so as to incline the post in that direction, and to this post a seat or saddle 18 is secured.

Preferably, and as herein shown, a box or wagon-body 19 may be employed, the box having a downwardly-extending lip 20 at its forward end for engagement with the brace 16, the lip and post being connected with the brace by one or more screws 21. Secured to the under side of the body near its rear end are springs 22, having forked ends 23, adapted to rest upon the rear ends of the blocks 7 and 8 on the axle 2, the box or wagon-body 19 being thus supported sufficiently above the axle to give clearance for the cranks 3 and 4. The head 24 of the horse is made separate from the body and secured between the sides of a yoke 25 at the upper end of a post 26, which extends down through the forward end of the body and rigidly connected with the fork 27, in which the front wheel 28 is mounted. Secured to the under side of the body at the forward end is a plate 29, through which the post 26 extends, and this plate has a rearward extension 30, terminating in a downwardly-extending stop-finger 31, and is provided with lugs or pins 32 to limit the turning of a fork which carries an arm 33, adapted to strike either of the pins 32 as the fork is turned. Projecting rearward from the upper end of the fork is an arm 34, carrying at its rear end a vertical pin 35, on which is mounted a friction-roller 36, this roller extending upward in rear of the finger 31. Pivotally secured to opposite sides of the plate 29 are arms 37, which arms extend rearward against opposite sides of the roller 36, and these arms are connected by a spiral spring 38, the tendency of which is to draw the rear ends of the arms together and against opposite sides of the stop-finger 31, which limits their movement toward each other.

At the mouth of the head of the horse 24 a bit 39 is secured, and to this bit reins 40 are connected, the ends of the bit projecting for a considerable extent beyond the sides of the head, so as to give sufficient leverage to permit the head to be easily turned by the reins.

Preferably the shafts 9 and 10 will be connected with the body by bolts 41, which pass through bushings 42, mounted in the body of the horse and corresponding in length to the thickness of the body and so that the shafts are clamped against the ends of the bushings. These bushings are desirable, as it permits the bolts to be turned to a rigid bearing and prevents the shafts becoming loose if the body of the horse, which is made from wood, should shrink. If two horses are employed, the shafts 9 and 10 will pass between them and one shaft secured to each horse's body. With two bodies the central pin 26, instead of extending up through the body of the horse, will extend up through a frame 43, secured to the forward ends of the shafts, and the heads of the horses will be merely swiveled to the bodies, and instead of forming the plate 29 with a rearward extension and stop-finger 31 a plate 44 will be connected to the under sides of the bodies in rear of the frame 43, and this plate will have a forward extension 45, terminating in a downwardly-extending stop-finger 46, corresponding to the said finger 31 before described. Pivotally mounted on this plate are arms 47, corresponding to the arms 37 and bearing against opposite sides of the roller 36 in the same way as before described, the arm 47 being connected by a spiral spring 48. In this construction the stop-lugs 49 will be arranged in the frame 43 to coact with the finger 50, carried by and turned by the fork and corresponding to the finger 31 before described. With two horses also the upper end of the post 26 will carry a transverse bar 51, the upper ends of which will be connected with the inner ends of bits 52 by cross-links 53 and so that movement of the reins attached to the outer ends of the bits will not only turn the heads of both horses, but turn the post 26, so as to turn the front wheel 28, which with two horses will stand between the bodies.

By employing two arms 37 or 47 I am only required to use a single coiled spring in order to hold the fork of the front wheel in a straight line. When the fork is turned in one direction, it moves one of the arms against the tension of its spring, the other arm being held by the stop-finger 31 or 46, and when it is turned in the opposite direction the other finger is moved and tends to return the arm into a straight line with the shafts.

Having fully described my invention, what I claim as new, and desire to secure by Letters Patent, is—

1. In a velocipede comprising an axle, wheels, seat and shafts, the combination of a body secured between the said shafts, a forward wheel, a fork in which said wheel is mounted, a post on said fork extending upward through the body, a rearwardly-extending arm carried by said fork and having an antifriction-roller, and pivotal arms adapted to bear on opposite sides of said roller and connected together by a spiral spring, substantially as described.

2. In a velocipede comprising an axle, wheels, seat and shafts, the combination of a body secured to the said shafts, a forward wheel for supporting said body, a fork in which said wheel is mounted, a post on said fork extending upward through said body, means for turning said post, an arm extending rearward from said fork with which it is directly connected and carrying a roller, pivotal arms extending into engagement with said roller and drawn together by a spiral spring, and means for limiting the movement of said arm, substantially as described.

In testimony whereof I have signed this specification in the presence of two subscribing witnesses.

EBEN W. HYDE.

Witnesses:
FREDRIC C. EARLE,
CLARA L. WEED.